United States Patent
Darrow, Jr.

(10) Patent No.: US 10,173,767 B2
(45) Date of Patent: Jan. 8, 2019

(54) AIRCRAFT WITH DRIVE ELEMENT COUPLED TO GEARBOX HOUSING EXTERIOR

(71) Applicant: Sikorsky Aircraft Corporation, Stratford, CT (US)

(72) Inventor: David A. Darrow, Jr., Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 329 days.

(21) Appl. No.: 14/915,090

(22) PCT Filed: Jun. 26, 2014

(86) PCT No.: PCT/US2014/044264
§ 371 (c)(1),
(2) Date: Feb. 26, 2016

(87) PCT Pub. No.: WO2015/030919
PCT Pub. Date: Mar. 5, 2015

(65) Prior Publication Data
US 2016/0207610 A1    Jul. 21, 2016

Related U.S. Application Data

(60) Provisional application No. 61/871,130, filed on Aug. 28, 2013.

(51) Int. Cl.
*B64C 11/44* (2006.01)
*B64C 27/82* (2006.01)
(Continued)

(52) U.S. Cl.
CPC .............. *B64C 11/44* (2013.01); *B64C 27/68* (2013.01); *B64C 27/82* (2013.01); *B64C 11/32* (2013.01); *B64C 2027/8236* (2013.01)

(58) Field of Classification Search
CPC ......... B64C 11/44; B64C 27/68; B64C 27/59; B64C 27/58; B64C 27/54; B64C 27/82; B64C 11/32; B64C 11/48; F05D 2260/76
See application file for complete search history.

(56) References Cited

U.S. PATENT DOCUMENTS

| 2,843,211 A | 7/1958 | Kottsieper |
| 4,660,437 A | 4/1987 | Scott |

(Continued)

FOREIGN PATENT DOCUMENTS

| EP | 2261115 A2 | 12/2010 |
| FR | 1031556 A | 6/1953 |

OTHER PUBLICATIONS

International Search Report and Written Opinion dated Nov. 5, 2014 in corresponding PCT Application No. US2014/044264, 10 pages.
(Continued)

*Primary Examiner* — Logan Kraft
*Assistant Examiner* — Justin A Pruitt
(74) *Attorney, Agent, or Firm* — Cantor Colburn LLP

(57) ABSTRACT

An aircraft is provided and includes a gearbox housing through which a drive shaft configured to drive propeller rotation extends and a pitch control apparatus. The pitch control apparatus includes a drive element coupled to an exterior of the gearbox housing and an annular electromechanical actuator (EMA) configured to convert rotational energy generated by the drive element to thereby control a pitching of propeller blades about corresponding pitch axes.

9 Claims, 4 Drawing Sheets

(51) Int. Cl.
*B64C 27/68* (2006.01)
*B64C 11/32* (2006.01)

(56) References Cited

U.S. PATENT DOCUMENTS

| | | |
|---|---|---|
| 6,152,696 A | 11/2000 | Rampal |
| 2008/0253891 A1 | 10/2008 | Cabrera et al. |
| 2011/0171027 A1 | 7/2011 | Perkinson |
| 2013/0119187 A1 | 5/2013 | Germanetti et al. |

OTHER PUBLICATIONS

ESSR; European Patent Office; Application No. PCT/US2014044264; 7 pages; dated Oct. 5, 2017.

AIRCRAFT WITH DRIVE ELEMENT COUPLED TO GEARBOX HOUSING EXTERIOR

CROSS-REFERENCE TO RELATED APPLICATIONS

This application claims the benefit of PCT Application No. U.S. 2014/044264, filed on Jun. 26, 2014, which in turn claims priority to U.S. provisional patent application Ser. No. 61/871,130, filed Aug. 28, 2013. The entire contents of PCT Application No. U.S. 2014/044264 and U.S. provisional patent application Ser. No. 61/871,130 are incorporated herein by reference.

FEDERAL RESEARCH STATEMENT

This invention was made with government support under W911W6-11-2-0007 awarded by the Army. The government has certain rights in the invention.

BACKGROUND OF THE INVENTION

The subject matter disclosed herein relates to an aircraft and, more particularly, to an aircraft with a drive element of a pitch control apparatus coupled to an exterior of a gearbox housing.

An aircraft, such as a helicopter, generally includes an airframe formed to define a cabin, an upper portion and a tail portion. The cabin is configured to accommodate a pilot and, in some cases, additional crewmen or passengers as well as controls accessible to at least the pilot so that the pilot can input flight control commands to a flight computer. The upper portion includes a pylon that is supportive of a main rotor and the tail portion includes a tail that is supportive of a tail rotor or propeller. The rotors/propellers are rotatable about rotational axes and can be pitched about pitch axes to provide for navigational and flight control of the aircraft.

Typically, pitch control of the rotor or propeller at the tail portion is controlled by an actuation unit provided as part of a gearbox housing that serves as a component in a transmission system operably disposed between an engine and the rotor or propeller. This configuration requires that the gearbox housing be increased in size and weight to accommodate the actuation unit.

BRIEF DESCRIPTION OF THE INVENTION

According to one aspect of the invention, an aircraft is provided and includes a gearbox housing through which a drive shaft configured to drive propeller rotation extends and a pitch control apparatus. The pitch control apparatus includes a drive element coupled to an exterior of the gearbox housing and an annular electro-mechanical actuator (EMA) configured to convert rotational energy generated by the drive element to thereby control a pitching of propeller blades about corresponding pitch axes.

According to another aspect of the invention, an aircraft is provided and includes a rotatable propeller comprising a plurality of blades configured to pitch about corresponding pitch axes, a plurality of pitch control rods respectively coupled to each of the blades, a gearbox housing through which a drive shaft configured to drive propeller rotation extends and a pitch control apparatus. The pitch control apparatus includes a drive element coupled to an exterior of the gearbox housing and an annular electro-mechanical actuator (EMA) configured to convert rotational energy generated by the drive element into axial movement of the pitch control rods to thereby control a pitching of the blades about the corresponding pitch axes.

According to yet another aspect of the invention, a pitch control apparatus of an aircraft is provided. The aircraft includes a drive shaft and a gearbox housing through which the drive shaft extends. The pitch control apparatus includes a drive element coupled to an exterior of the gearbox housing and comprising a first gear and a motive component configured to drive first gear rotation, a spline disposed to be axially movable at the exterior of the gearbox housing and comprising a first bearing element and a second bearing element. The second bearing element includes a second gear configured to mesh with the first gear such that the first gear rotation drives a rotation of the second bearing element and a control part formed to define a groove configured to mesh with the first bearing element such that the rotation of the second bearing element drives axial movement of the spline.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
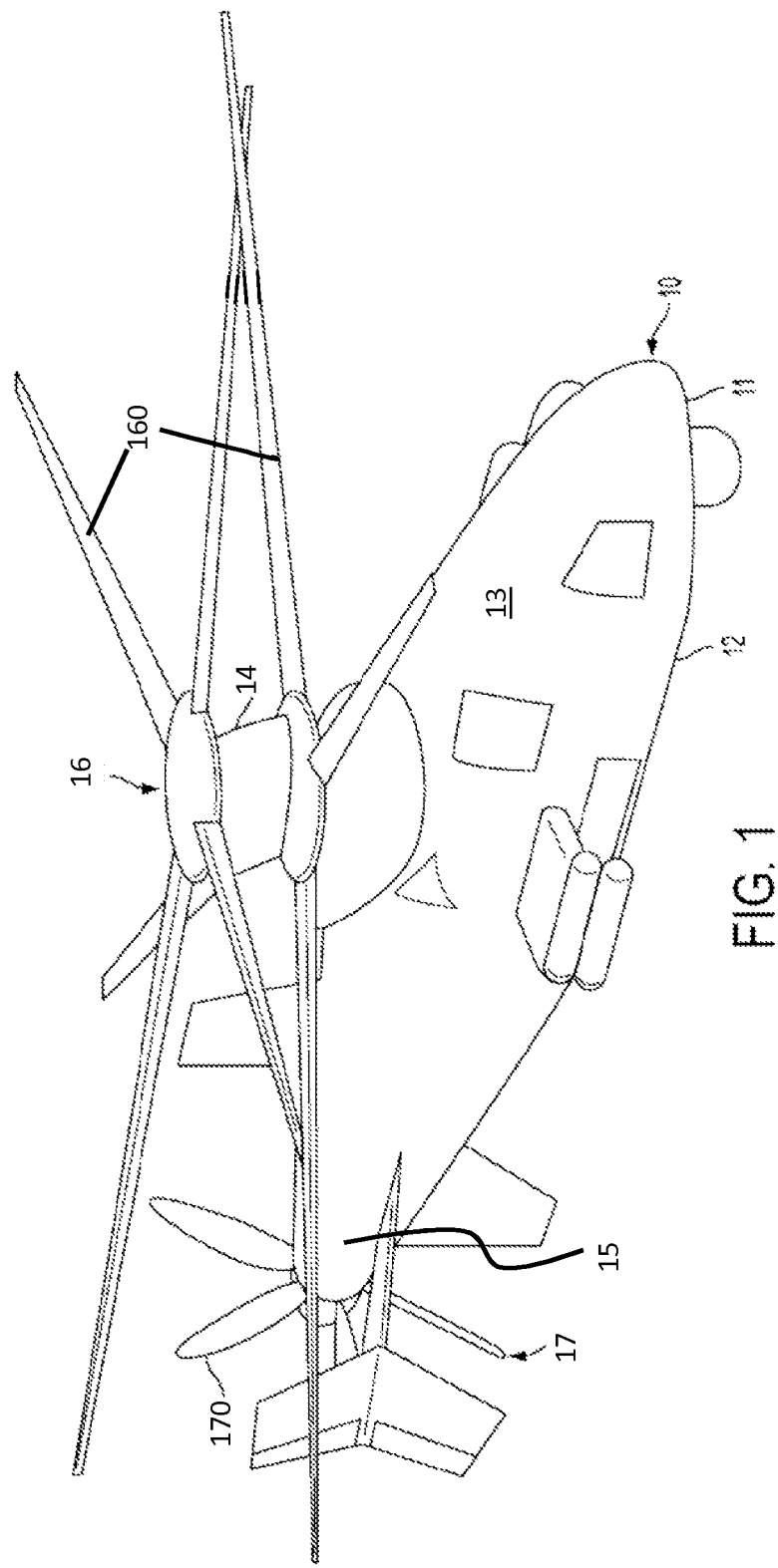
FIG. 1 is a perspective view of an aircraft in accordance with embodiments.

With reference to FIGS. 1-3 and 5, an aircraft 10 is provided. As shown in FIG. 1, the aircraft 10 may be a helicopter 11 having a flight control computer 100 (see FIG. 5) and an airframe 12 that is formed to define a cabin 13, an upper portion 14 and a tail portion 15. The cabin 13 is configured to accommodate a pilot and, in some cases, additional crewmen or passengers as well as controls accessible to at least the pilot so that the pilot can input flight control commands to the flight computer 100. The upper portion 14 includes a pylon that is supportive of a main rotor 16 and the tail portion 15 includes a tail that is supportive of a propeller 17. Both the main rotor 16 and the propeller 17 are rotatable about respective rotational axes with respect to the airframe 12 to provide for navigational controls of the aircraft 10 in accordance with the flight control commands inputted to the flight computer 100 by the pilot.

Figure 2:
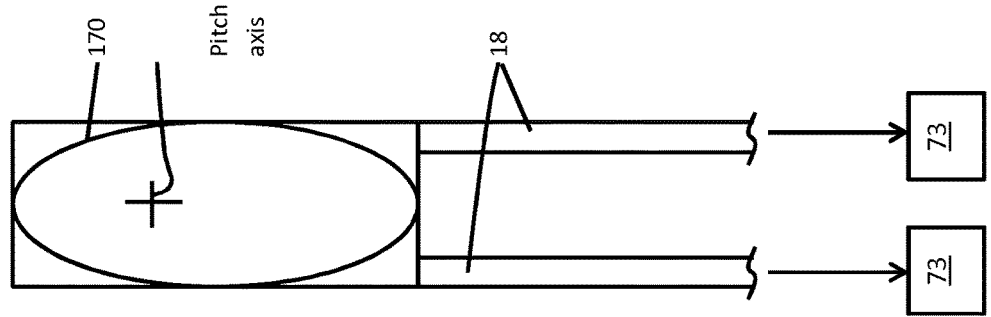
FIG. 2 is a schematic illustration of a pitch control assembly of the aircraft of FIG. 1.

As shown in FIGS. 1 and 2, the main rotor 16 includes main rotor blades 160 and the propeller 17 includes propeller blades 170. At least the propeller blades 170 are configured to pitch about corresponding pitch axes and such pitching is achieved by controlled axial or linear movement of pitch control rods 18 that are coupled to each of the propeller blades 170. The pitching provides for additional navigational controls of the aircraft in accordance with the flight control commands inputted to the flight computer 100 by the pilot.

Figure 3:
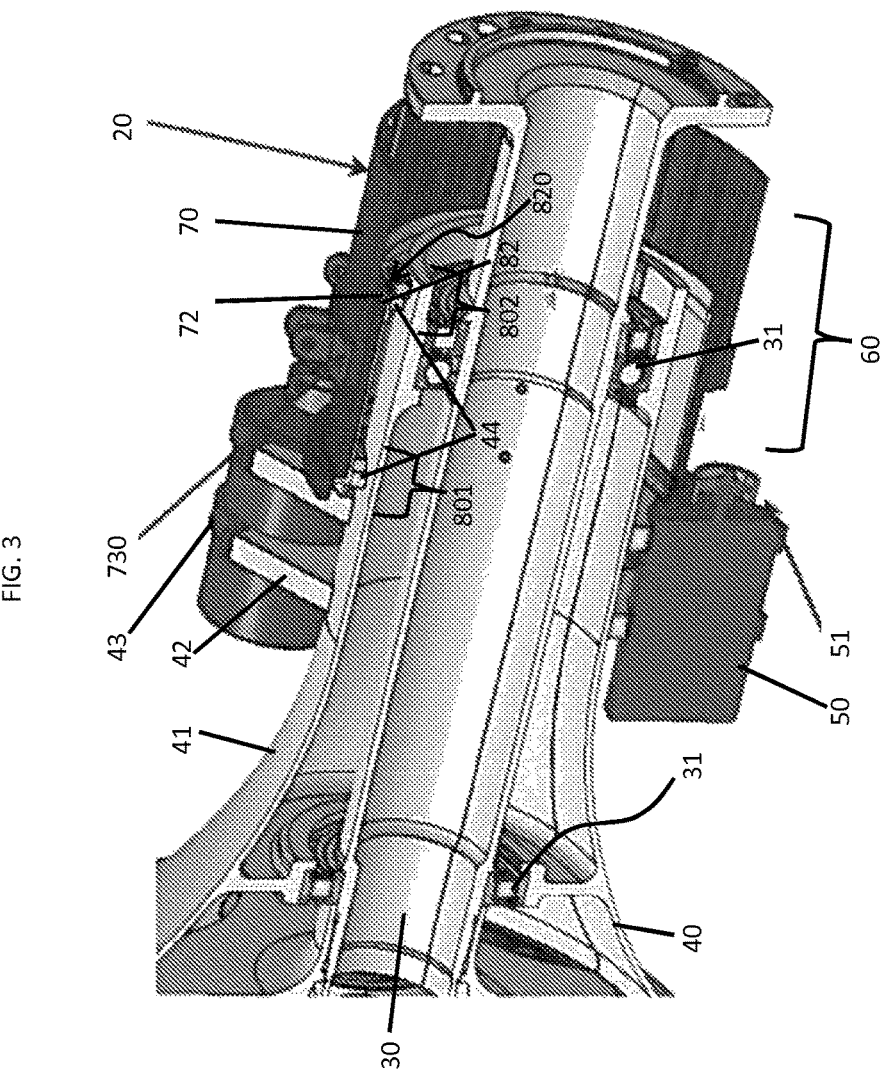
FIG. 3 is a cutaway perspective view of a tail portion of the aircraft of FIG. 1.

The aircraft 10 may further include an engine, a transmission system and a pitch control apparatus 20. The engine generates motive power that drives rotation of the main rotor 16 and the propeller 17 and the transmission system transmits the motive power from the engine to the main rotor 16 and the propeller 17. As shown in FIG. 3, the transmission system includes a drive shaft 30 and a gearbox housing 40. The drive shaft 30 extends through the gearbox housing 40 and is supported by bearing elements 31. In this condition, the drive shaft 30 is rotatable about a central longitudinal axis thereof and configured to drive rotation of the propeller 17 about its rotational axis (i.e., the central longitudinal axis of the drive shaft 30).

Figure 4:
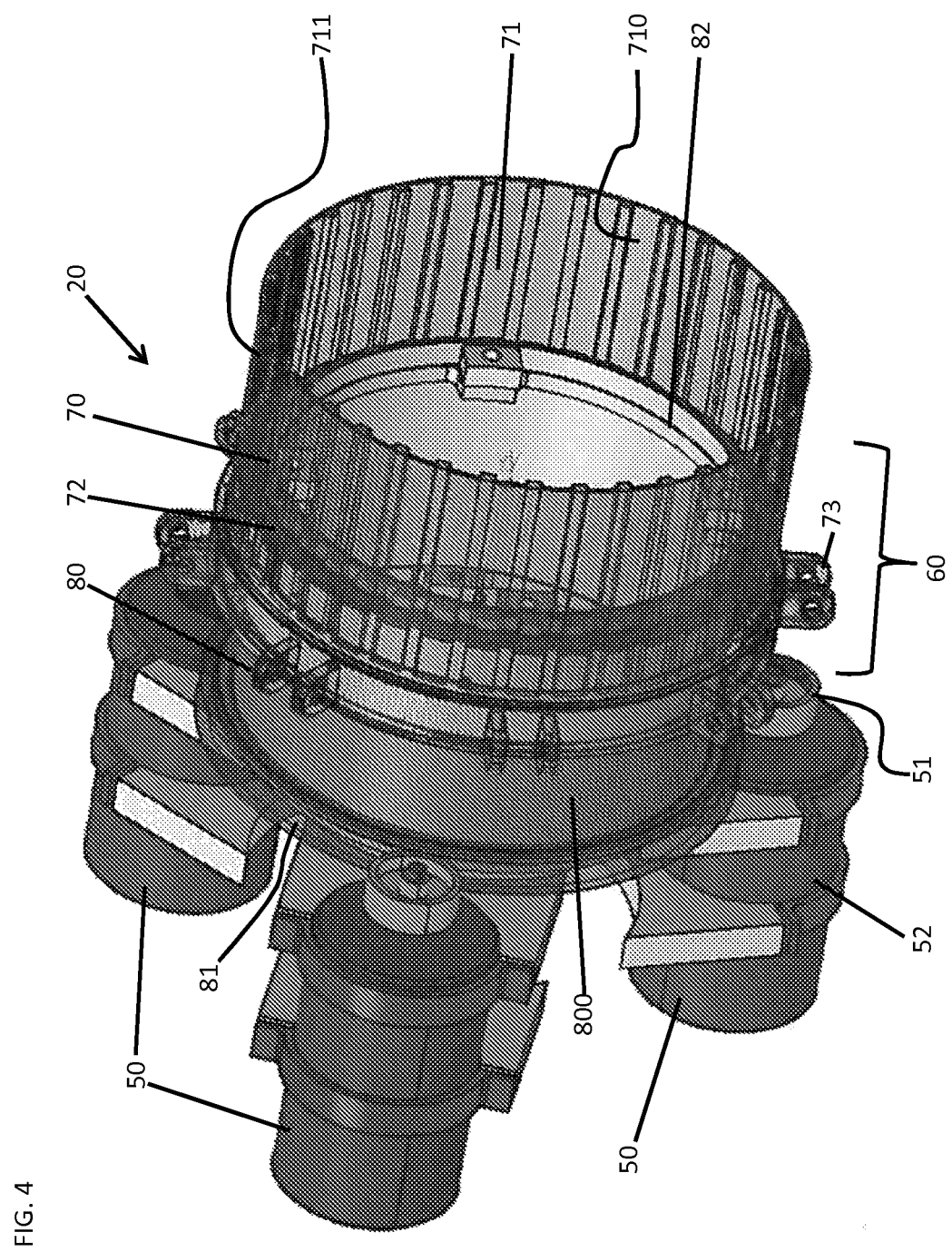
FIG. 4 is a perspective view of a pitch control apparatus of the tail portion of FIG. 3 in accordance with embodiments.

With reference to FIGS. 3 and 4, the pitch control apparatus 20 includes a drive element 50 and an annular electro-mechanical actuator (EMA) 60. The drive element 50 is coupled to an exterior surface 41 of the gearbox housing 40 between one or more saddles 42 and one or more straps 43. The one or more straps 43 may be rigid, compliant or flexible. The EMA 60 is coupled to the drive element 50 and is configured to convert rotational energy generated by the drive element 50 into axial or linear movement of the pitch control rods 18 (see FIG. 2) to thereby control a degree of the pitching of the propeller blades 170.

In greater detail, the drive element 50 includes a first gear 51 and a motive component 52 configured to drive a rotation of the first gear 51. In accordance with embodiments, the first gear 51 is rotatable about a central longitudinal axis defined through the motive component 52. In accordance with further embodiments, the motive component 52 may be provided as a servo motor although it will be understood that any suitable device can be used.

The EMA 60 includes a spline 70 and a second bearing element 80. The spline 70 is annular or ring-shaped and disposed to be axially movable but rotationally fixed relative to the gearbox housing 40 at the exterior of the gearbox housing 40. The spline 70 includes an annular or ring-shaped body 71 and a first bearing element 72. The annular or ring-shaped body 71 has an interior surface 710 to which the first bearing element 72 is coupled and an exterior surface 711. The spline 70 may further include a plurality of duplex bearings 73 coupled to the exterior surface 711. Each of the duplex bearings 73 may be separately coupled and affixed to the exterior surface 711 or, as shown in FIG. 3, each of the duplex bearings 73 may be separately coupled and affixed to a ring element 730 that is in turn coupled and affixed to the exterior surface 711. The pitch control rods 18 (see FIG. 2) of the propeller 17 may be respectively coupled by, for example, a pin connection or hinge to corresponding ones of the duplex bearings 73 such that axial or linear movement of the spline 70 and the duplex bearings 73 causes corresponding axial or linear movement of the pitch control rods 18.

The second bearing element 80 includes an annular or ring-shaped body 800. The second bearing element 80 is disposed at a fixed axial location relative to the gearbox housing 40 and is rotatable about the drive shaft 30 in accordance with the rotation of the first gear 51 of the drive element 50. The second bearing element 80 may be supported by gearbox bearing elements 44 that permit rotation of the second bearing element 80 about the drive shaft 30 and prevent axial movement of the second bearing element 80 relative to the gearbox housing 40.

The second bearing element 80 includes first and second opposite axial ends 801 and 802, a second gear 81 disposed at the first axial end 801 and a control part 82 disposed at the second axial end 802. The second gear 81 is configured to mesh with the first gear 51 of the drive element 50 such that the rotation of the first gear 51 drives a corresponding rotation of the second bearing element 80. The control part 82 is formed to define a groove 820, which may have a spiraling formation. The groove 820 is configured to receivably mesh with the first bearing element 72 such that the rotation of the second bearing element 80 drives axial movement of the spline 70. That is, as the second bearing element 80 rotates about the drive shaft 30, the first bearing element 72 effectively travels through the groove 820 and the spiraling formation of the groove 820 causes the first bearing element 72 and the spline 70 as a whole to move axially relative to the gearbox housing 40. This axial movement of the spline 70 may then be transferred to the pitch control rods 18 (see FIG. 2) as noted above.

In accordance with further embodiments and, with reference to FIGS. 3 and 4, the drive element 50 may be provided as three or more drive elements 50 that each includes the first gear 51 and the motive component 52 described above. In such cases, the three or more drive elements 50 may be individually powerful enough to operate the pitch control apparatus 20 alone such that the pitch control apparatus 20 is operable with only a single operating drive element 50 and at least two drive elements 50 being provided as fail safe devices.

In accordance with still further embodiments and, with the three or more drive elements 50 being individually powerful enough to operate the pitch control apparatus alone, the pitch control apparatus 20 is tolerant to a hard-over condition of a single drive element 50. A hard-over condition occurs when a failure, such as a short circuit of control circuitry of a drive element 50, happens and causes the first gear 51 of that drive element 50 to rotate in a direction opposite to the desired direction. In such a case, where the first gears 51 of the other two drive elements 50 rotate in the correct direction, one of the other two drive elements 50 cancels out the malfunctioning drive element 50 and the remaining drive element 50 effectively operates the pitch control apparatus 20 alone.

Figure 5:
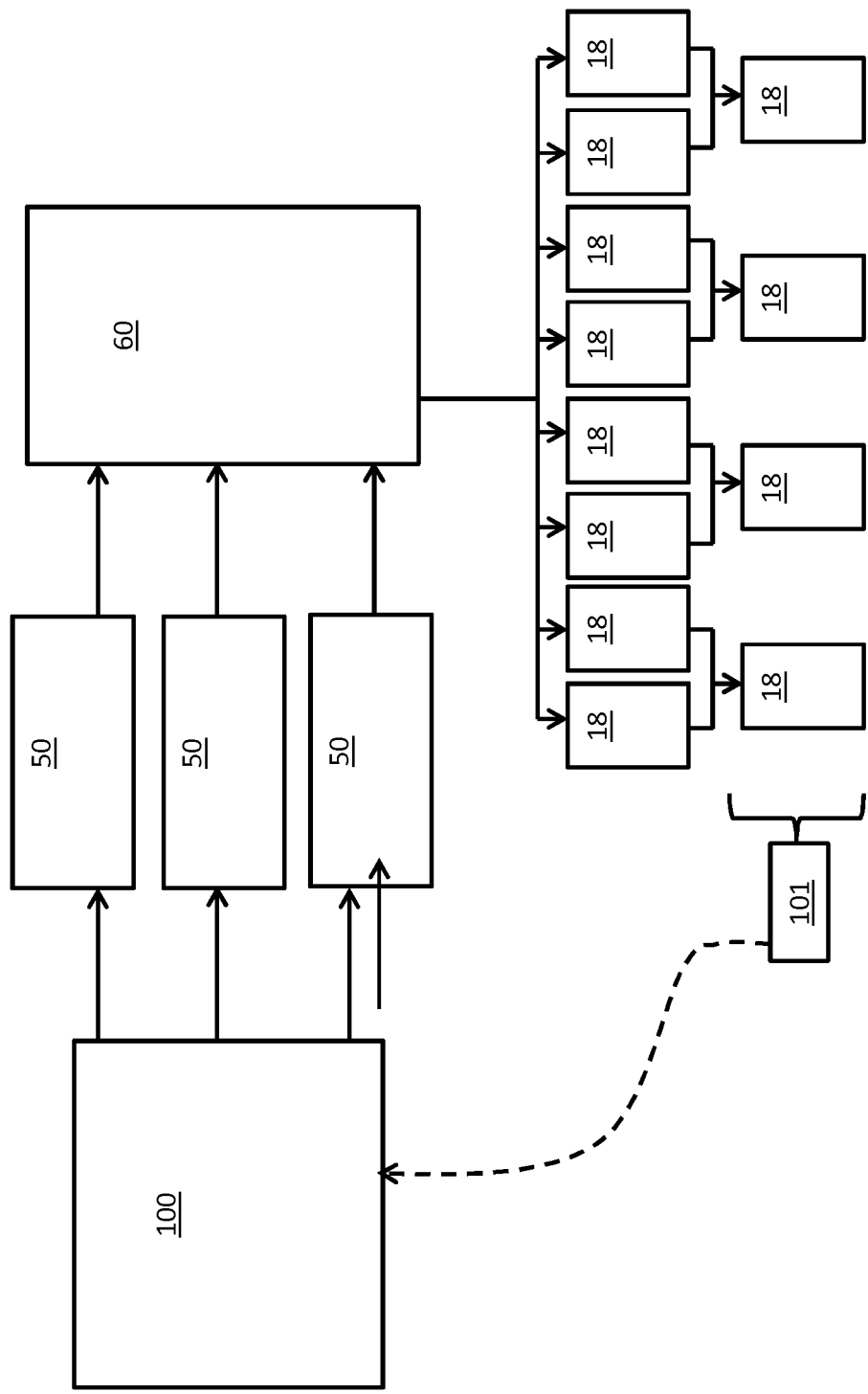
FIG. 5 is a schematic diagram illustrating a control system of the pitch control apparatus of FIG. 4 in accordance with embodiments.

This can be seen in the schematic diagram of FIG. 5 in which the flight control computer 100 is illustrated as being disposed in signal communication with the three or more drive elements 50 and a sensor 101 that monitors a degree of the pitching of the propeller 17 about the pitch axis. As such, the flight control computer 100 is able to issue signals to the three or more drive elements 50 to have their respective first gears 51 rotate in a first direction. If all three of the three or more drive elements 50 are operating correctly, the propeller 17 will be driven by the EMA 60 and the pitch control rods 18 to pitch about the pitch axis with the sensor 101 identifying when the pitching is complete. Using input provided by the sensor 101 in a feedback loop, the flight control computer 100 will instruct the three or more drive elements 50 to continue the pitching operation, to correct the pitching operation by driving the pitching in an opposite direction or to stop the pitching operation. If one of the three or more drive elements 50 is operating incorrectly, the same result will be achieved since one of the other two drive elements 50 cancels out the malfunctioning drive element 50 and the remaining drive element 50 effectively operates the pitch control apparatus 20 alone. It will be understood that, in the latter case, the pitching operation may require additional time for completion.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A pitch control apparatus of an aircraft including a drive shaft and a gearbox housing through which the drive shaft extends, the apparatus comprising:
    a drive element coupled to an exterior of the gearbox housing and comprising a first gear and a motive component configured to drive first gear rotation;
    a spline disposed to be axially movable at the exterior of the gearbox housing and comprising a first bearing element; and
    a second bearing element comprising:
    a second gear configured to mesh with the first gear such that the first gear rotation drives a rotation of the second bearing element; and
    a control part formed to define a groove configured to mesh with the first bearing element such that the rotation of the second bearing element drives axial movement of the spline.

2. The apparatus according to claim 1, wherein the drive element is provided as three or more drive elements.

3. The apparatus according to claim 2, wherein the apparatus is operable with a single operating drive element.

4. The apparatus according to claim 2, wherein each one of the three or more drive elements comprises the first gear and the motive component.

5. The apparatus according to claim 4, wherein a direction of the first gear rotation of each of the three or more drive elements is independently controllable.

6. The apparatus according to claim 1, wherein the spline comprises:
    an interior surface to which the first bearing element is coupled;
    an exterior surface; and
    a plurality of duplex bearings coupled to the exterior surface.

7. The apparatus according to claim 1, wherein the second bearing comprises first and second opposite axial ends, the second gear being disposed at the first axial end and the control part being disposed at the second axial end.

8. The apparatus according to claim 1, wherein the second bearing element is disposed at a fixed axial location relative to the gearbox housing and rotatable about the drive shaft in accordance with the first gear rotation.

9. The apparatus according to claim 1, wherein the control part is formed to define a spiral groove.

* * * * *